June 16, 1925. 1,541,789
C. H. CASPAR
PROCESS OF DEALCOHOLIZATION AND APPARATUS FOR PERFORMING THE SAME
Filed Oct. 22, 1920
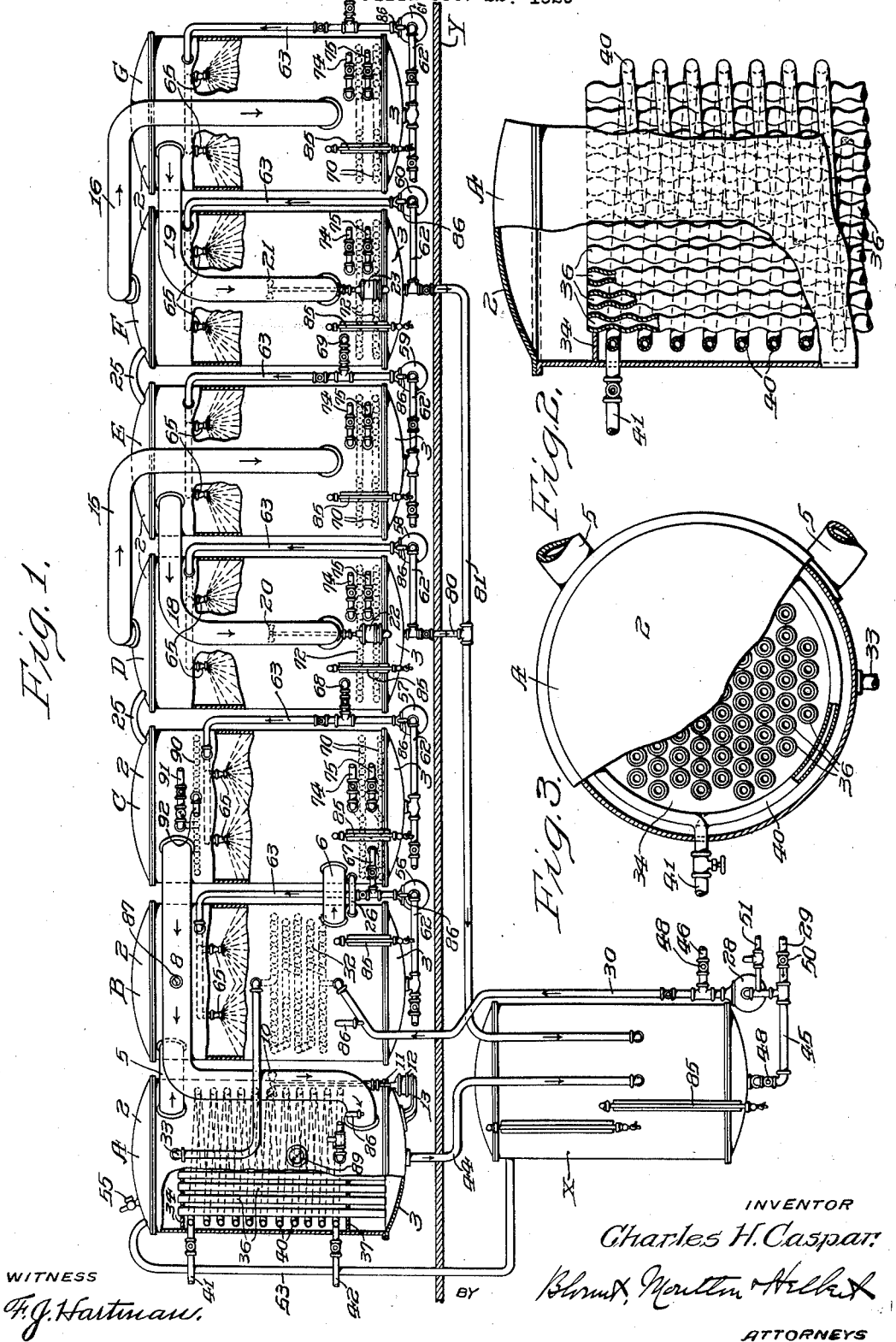
WITNESS
F. J. Hartman
INVENTOR
Charles H. Caspar
BY
Blum, Moulton & Willcox
ATTORNEYS Patented June 16, 1925.

1,541,789

UNITED STATES PATENT OFFICE.

CHARLES H. CASPAR, OF PHILADELPHIA, PENNSYLVANIA.

PROCESS OF DEALCOHOLIZATION AND APPARATUS FOR PERFORMING THE SAME.

Application filed October 22, 1920. Serial No. 418,787.

To all whom it may concern:

Be it known that I, CHARLES H. CASPAR, a citizen of the United States, and a resident of the city of Philadelphia, county of Philadelphia, and State of Pennsylvania, have invented a certain new and useful Process of Dealcoholization and Apparatus for Performing the Same, of which the following is a specification, reference being had to the accompanying drawing.

My invention relates to the dealcoholization of beverages and other liquids by cooling the same to extract the alcohol instead of heating them as practised in other processes, whereby I am enabled to carry out the process at substantially any temperature or pressure at which there is no detrimental effect on or change in the beverage or other liquid, and in the form hereinafter described is more particularly adapted for the dealcoholization of beer and other brewed liquors, the alcoholic content of which I am enabled, by the use of my process, to reduce to any desired point without materially impairing the flavor, aroma, foam stability, appearance and other qualities of the liquor. Since in the practice of my invention I preferably, though not necessarily, maintain the liquid being operated upon at a relatively low temperature, a condition which is extremely desirable in that the original characteristics of the beer or other liquid being treated are not affected by being raised to temperatures which impair the flavor and other characteristics thereof, so that the dealcoholization may be carried out without detrimental effect on the treated liquid. Additionally, I preferably perform and carry out my improved process in such manner that substantially no portion of the liquid being treated is lost either by evaporation or otherwise, the quantity of beer or other treated liquid at the termination of the process being practically the same as before treatment save for the diminution occasioned by the abstraction of the alcohol. In other words, starting with 100 barrels of beer, for example containing initially 4% alcohol by volume, after treatment and reduction of the alcoholic content to, say ½ of 1%, substantially 96½ barrels of beer remain, avoiding the necessity of "making up" the finished product by the addition of liquids not of the same composition as the beer on account of excessive losses, such as have occurred in dealcoholization processes as heretofore practised. Additionally, the alcohol abstracted from the liquid is reclaimed in the form of a relatively pure liquid suitable for uses in the various arts if desired without further treatment.

These and other objects and advantages of my process of dealcoholization will more clearly appear from the subjoined description of a preferred method of practising the invention and of a preferred form of apparatus suitable for use therein, although it will be understood that apparatus other than that described and illustrated in the accompanying drawing may be utilized if desired. However, the apparatus shown is suitable for the purposes intended and is one which may be readily contrived and adapted from brewing apparatus of the kind generally found in breweries as at present equipped by suitable rearrangement and reconstruction thereof, so that the expense of installation of my improved apparatus in breweries having the necessary equipment is materially reduced below that which might be requisite were some other form of apparatus necessitating the installation of completely new equipment employed.

In the drawing, in which like numerals are used to designate corresponding parts in the different figures, Fig. 1 is a front elevation of a somewhat diagrammatic character showing a preferred form of apparatus, portions of certain of the parts being broken away for the purpose of showing more clearly certain of the mechanism within the vats; Fig. 2 is a fragmentary enlarged view of a portion of one of the vats with the side wall thereof broken away to more clearly show the interior arrangement, and Fig. 3 is a fragmentary plan view partially in horizontal section taken on line 3—3 of Fig. 2.

While, as hitherto stated, my process is well adapted for the dealcoholization of various liquids, it may be employed to great advantage in the dealcoholization of beer and other fermented or brewed liquors, and I shall hereinafter, in describing the process, refer generally to the liquid being treated as "beer", it being understood, however, that I do not thereby desire or intend to in any way limit the use of the process solely to the dealcoholization thereof.

In the practice of the process I effect the desired removal of the alcoholic content of the beer by subjecting the relatively warm beer to the action of relatively cooler gases and vapors which in a single cycle effects a partial removal of the alcohol, at the same time lowering the temperature of the beer, and then by reheating the beer and cooling the gases to condense out the alcohol and other liquids in suspension therein, continue repetition of the cycle until the required amount of alcohol is removed. Preferably in order to avoid a marked diminution in the quantity of the beer undergoing treatment, I also arrange to subject the liquid condensed from the gases and vapors as aforesaid, which liquid I shall hereinafter designate under the general term "low wines," to substantially similar treatment in consecutive operations or cycles to separate as far as possible the alcohol and other liquids and solids, which latter are thereafter returned to the beer undergoing treatment, so that at the completion of the process the quantity of the finished product, that is, of the dealcoholized beer, is substantially undiminished except for an amount equal to that of the alcohol removed.

Referring now to the drawing, the apparatus shown therein comprises a plurality of vats or tanks A, B, C, D, E, F, G, and X, or, if desired, a greater or less number of vats may be employed. It will be understood that the vats which in practice may be suitably heat insulated in any convenient manner, together with their auxiliary mechanism and piping hereinafter described, are suitably supported in any convenient manner so as to occupy a generally upright position, the several vats being preferably of cylindrical form and provided with the heads 2 and bottoms 3 secured to the sides of the vats to prevent leakage at their points of junction. Conveniently the vat X may be supported below a floor Y and the other vats thereabove, as for example, in a higher story of the building in which the apparatus is contained.

The vat A, in which, as hereinafter more fully explained, the first dealcoholization of the beer is effected, is connected to the vat B by one or more conduits 5 of suitable diameter positioned adjacent the top of the vats, and the vats B and C are similarly connected by one or more conduits 6 positioned, however, more nearly adjacent the bottom than the top of these vats. It will be understood that while in Fig. 1 only the conduits 5 and 6 most nearly adjacent the observer are shown, similar conduits are preferably positioned on the rear side of the vats, and that in certain constructions instead of using only a pair of conduits to connect each pair of vats, a greater or less number may be conveniently employed. The vat C is also connected with the vat A by a conduit 8 of a suitable diameter preferably extending from near the top of vat C to near the bottom of vat A, and means are arranged preferably within the conduit for creating a circulation of air or vapor from the vat C to the vat A, said means, in the form of the apparatus illustrated, comprising a fan 10 positioned within the conduit and operated through the medium of a shaft 11 by an electric motor 12 supported on a bracket 13 affixed to the vat A, but other means suitable for this purpose may be employed if desired.

The vat D is preferably connected with the vat E by a conduit 15 extending from adjacent the top of vat D to a point below the center of vat E and the vats F and G are similarly connected by a conduit 16. Vat E is also connected with the vat D by a conduit 18 extending from near the top of vat E to a point below the center of vat D and the vats G and F are similarly connected by a conduit 19. Within each of these conduits are preferably positioned suitable means for creating a circulation of gas and vapors therethrough which may comprise fans 20 and 21 actuated from motors 22 and 23 preferably positioned outside of the conduits and, in certain constructions, if desired, a greater number of conduits than shown may be utilized. The upper parts of vats C and D and E and F may preferably respectively be connected by equalizer pipes 25, and an overflow pipe 26 is arranged near the lower part of vats B and C to maintain a substantial equality of liquid level therein.

A suitably positioned pump 28 is connected through a pipe 29 to draw beer from the beer storage tanks and to discharge the beer so drawn through a pipe 30 into a coil 32 of suitable construction positioned within the vat B and from thence by pipe 33 into the upper part of vat A onto a transversely extending baffle plate 34 positioned therein which forms a header for a plurality of preferably corrugated tubes 36 extending vertically within the vat and passing through and projecting below another baffle plate or header 37 positioned in the lower part of the vat and preferably slightly above the point of connection of the conduit 8. In Fig. 1, on account of its small scale, these tubes are shown as having straight sides or walls, but in practice the tubes are preferably transversely corrugated somewhat as shown in Fig. 2, so that the beer in passing therethrough, as hereinafter more fully described, will not form rivulets on the sides of the tubes but will be distributed over their entire inner surfaces in a thin film, and thus present an extended area for contact with the gases and vapors, which in the practice of the process are forced upwardly through the tubes from the bottom of the vat, as well as retard the flow of beer to give a longer time for cooling. In order to maintain the beer flowing through the tubes as nearly as possible at a predetermined temperature, the tubes between the baffle plates are preferably surrounded with suitable heating means such as a water bath, the temperature of which is regulated by means of a coil 40 surrounding the tubes and immersed in the water to which steam or other heating medium may be admitted through an inlet 41 and escape therefrom through an outlet 42. The lower part of vat A is connected through a pipe 44 with the vat X which, in turn, is connected by a discharge pipe 45, through which the contents of the vat may be pumped by means of the pump 28, to a discharge pipe 46 connected with storage tanks, not shown, for the dealcoholized beer. It will of course be understood that when the pump is used for drawing fresh beer from the pipe 29, valves 48 suitably positioned in the discharge pipes will be closed, and conversely, when the pump is used to draw the dealcoholized beer from the tank X, the valve 50 in the pipe 29 will be closed. A feeder or injector 51 may be connected adjacent the pump 28 for feeding $CO_2$ or other gas into the fresh beer or into dealcoholized beer passing through the pump for the purpose of charging the same if desired.

The vat X may also be connected with the vat A by means of a pipe 53 extending from the top of the former vat to the latter for the purpose of equalizing the pressures therein, and vat A may also be provided with a safety valve 55 for controlling the pressure in the system.

Located adjacent each of the several vats B to G inclusive are pumps 56, 57, 58, 59, 60 and 61, each of which is effective to pump through a pipe 62 the contents of its adjacent vat from the bottom to the upper part of the vat through a pipe 63. Each of the latter pipes is connected with a plurality of spray nozzles 65 or other suitable means located within its adjacent vat effective to discharge the liquid passing from the pipe downwardly into the vat in finely divided form. The pumps 56, 57 and 59 are also preferably so connected as by valve controlled connections 67, 68 and 69 so that the same may be utilized to pump the contents of vats B, C and E respectively into vats C, D and F when required.

Within and near the bottom of each of the vats C, D, E, F and G is preferably positioned a coil which, in the operation of the process is employed for heating or cooling the liquid collected in the bottom of the vat. In the form of the apparatus shown the coils 70 positioned in vats C, E and G are adapted for cooling the liquid therein, while coils 72 in vats D and F are adapted for heating the liquid therein. It will be understood that, as shown in the drawing, the several coils are provided with inlet and outlet pipes 74 and 75 suitably valve controlled and connected to introduce suitable heating or frigerating mediums into the different coils to enable them to perform their respective functions. Drain pipes 78 suitably valve controlled, are arranged for emptying certain of the vats when desired.

The vats D and F in which, during the performance of the process, a certain portion of the dealcoholized product is collected, may also be conveniently connected by valve controlled pipes 80 and 81 with the vat X so that at the completion of the process or any other suitable time, the dealcoholized beer contained in these vats may be discharged into the vat X to mingle with the similarly dealcoholized beer discharged thereinto from the vat A. From the vat X the dealcoholized beer may be conducted when required through the medium of pipes 45, 46 to the storage tanks in which it may be kept until marketed, or may be pumped upwardly to the coil 32 as hereinafter described. Preferably positioned in the upper part of vat C, is a heating coil 90 with suitable connections 91 and 92 through which the heating medium is conducted to and from the coil. This coil is preferably situated slightly below the conduit 8.

It will be understood that each of the vats is preferably provided with a suitable gage 85 for determining the height of the liquid therein; that thermometers 86 are disposed at suitable points throughout the apparatus to conveniently permit the determination of the temperature of the liquid at such points; that hygrometers 87 are similarly conveniently arranged for indicating the moisture content of the gases and vapors in the apparatus and that pressure gages 89 are similarly arranged for indicating the pressure at different points. The vat A may also be provided with an automatic or other feeder or injector through which charging gas, such as $CO_2$, may be introduced when desired and similar feeders may be located at other points in the apparatus such as adjacent pump 28, as hitherto described.

The direction of flow of the beer, vapors and low wines in the apparatus under normal conditions of operation is indicated throughout the drawing by arrows.

In the practice of the process when utilizing an apparatus substantially similar to that hitherto described, the beer which is to be treated and which preferably consists of finished beer, i. e., beer ready for human consumption which has been manufactured by the ordinary methods hitherto employed in brewing is initially pumped from the beer storage tanks in any desired quantity, for example 100 barrels, by means of pump 28 and forced through the coil 32 to the header 34 from whence it trickles slowly down through tubes 36 to the bottom of vat A and thence into vat X. The beer as it comes from the storage tanks is generally of relatively low temperature when introduced into the apparatus, such, for example, as 35° F. It will be understood, however, that the successful performance of the process is not dependent upon the introduction of the beer at such temperature or of the exact maintenance of the various other temperatures, humidities and pressures hereinafter referred to by way of example merely, as the process may be successfully operated under conditions of temperature, humidity and pressure materially different therefrom should conditions of operation make the same necessary or desirable, so long as the relative temperatures of the beer, low wines and gases and vapors are so maintained that when the gases and vapors are brought into contact with the beer and low wines they are at relatively lower temperature than the latter so as to absorb alcohol therefrom, which alcohol so absorbed is thereafter condensed from the said gases and vapors by bringing them into contact with a condensing medium, preferably previously condensed low wines, at a higher temperature than that of the condensing medium, as hereinafter more fully described.

Since in the performance of the process with an apparatus substantially similar to that herein described, the low wines abstracted from the beer being treated, collect in vats B, C, E and G and are preferably employed to assist in the removal of the alcohol from subsequent batches of beer, I will therefore assume, to facilitate description of the process, that these vats each initially contain a quantity of low wines which have accumulated through the previous treatment of other batches of beer.

The requisite quantity of beer being introduced to the apparatus from the storage tanks, as hitherto described, the several pumps 57 to 61 are started, as well as the motors operating the fans in the several conduits. To facilitate the description of the action which now takes place, I will first confine the same to the operations in vats A, B, C and X with their auxiliary pumps and other mechanism, and will then refer more in detail to the operations which preferably simultaneously occur in the other vats, and for convenience will assume that the process has been in operation long enough to establish normal working conditions as regards temperature and the like.

By reason of the passage over the coil 32 of warm gases and vapors coming from vat A, the beer, in its traverse of the coil, is heated materially from its initial temperature whether the beer is taken directly from the storage tanks or from vat X so that it reaches the header in vat A at preferably substantially 50° F. and as it trickles downwardly through the tubes 36, this temperature is first elevated slightly, say to 65° F. and then gradually reduced until the beer emerges from the tubes at substantially 35° F. or thereabouts. Contemporaneously with the passage of the beer through tubes 36, the gases and vapors contained in vat C are discharged through conduit 8 near the bottom of vat A preferably at substantially 42° F. and 30% humidity to pass upwardly through the tubes in contact with the downwardly flowing beer, which owing to the configuration and number of the tubes, presents a large surface for contact therewith, resulting in the absorption by the gases and vapors of a considerable portion of the liquid including alcohol, so that the former leave the vat by conduit 5 at substantially 60°-63° F. and with whatever may be their quota of aqueous vapor, say from 2% to 4%.

Meanwhile, through the operation of pump 56, the previously condensed low wines in vat B which may be assumed to be approximately at 40° F. are pumped upwardly to the spray nozzles 65 therein which are located below the mouths of the conduits 5 and discharged therefrom at substantially that temperature to impinge on the coil 32 in finely divided condition. However, in their passage from the nozzles to the coil, contact of the gas and vapors from pipes 5 on their way to pipes 6 cause an elevation in temperature of the sprayed low wines to substantially 50° F., at which temperature they strike the coil 32 containing the colder beer and are thus cooled in their passage to the bottom of the vat to their initial temperature of substantially 40° F. During the passage of the gas and vapors through the vat B and contact therein with the materially colder spray of condensed low wines, a considerable proportion of the alcohol is condensed out in the form of low wines and accumulates in the bottom of the vat with the low wines initially therein, so that the gas and vapors leave this vat through the pipes 6 and enter the vat C with a materially lessened percentage of alcohol in suspension than when they entered the vat B, and it is a function of vat C and its connected apparatus to complete as far as possible the removal of the remaining alcohol in the gas and vapors, or so much thereof as may be desired.

Through the medium of the pump 57 the low wines in the bottom of vat C which may be assumed to be maintained approximately at a temperature of 32° F. by means of the coil 70 are pumped upwardly to spray nozzles 58 to intimately mix in their downward passage therefrom with the upwardly moving gases and vapors which have entered vat C from the pipe 6 at a temperature of substantially 40° F. to which they have been brought in their passage through the vat B. As in the vat B, the contact of the gases and vapors with the relatively colder spray of low wines is effective to condense out an additional amount of the alcohol contained therein which collects at the bottom of the vat.

During their passage upwardly in vat C through the spray of low wines, the gases and vapors are lowered in temperature to approximately that of the entering low wines, to wit, 32° F., and at that temperature and substantially at a point of saturation, strike the heating coil 90 which is so operated as to preferably raise the gases and vapors to substantially 42° F. and 30% humidity, under which condition they are again returned through the conduit 8 to the vat A.

It will be understood that in each passage of a given quantity of beer through that part of the apparatus comprised in vats A, B, C and X and their adjacent mechanism under the conditions just described, a considerable portion of the alcohol is removed, and therefore that in practice the cycle is preferably repeated by pumping the beer continuously from vat X to coil 32 a sufficient number of times until the desired quantity of alcohol is abstracted, suitable tests being made from time to time to determine when that condition is attained. However, it will be evident that the condensation occurring in vats B and C in each cycle is not wholly confined to alcohol, but that a considerable part of the other liquids and solids initially contained in the beer will also be condensed out to form low wines in these vats, so that if the process were wholly confined to that part of the apparatus to which I have hitherto referred, the quantity of the dealcoholized product finally collected in vat X would be materially less than the total quantity of beer with which the process was initiated, the condensed liquids remaining in vats B and C forming frequently as much as 26% of that total. Under these conditions it would be requisite to "make up" the dealcoholized beer by the addition of some "make up" liquid in order to prevent undue losses in manufacture, a practice which is expensive and also detrimental to the quality of the finished product, as obviously the "make up" cannot consist of beer brewed in the ordinary manner and containing the usual quantity of alcohol, but must consist of something artificially prepared to approximate the taste and other qualities of beer but with no alcoholic content. The objections to the use of "make up" are well recognized, but with all dealcoholization processes hitherto practised its use is unavoidable, and it is a function of the vats D to G inclusive with their auxiliary apparatus, to effect the removal of the alcohol contained in the condensed low wines in vats B and C, so that the other part of the liquid forming these low wines may be thereafter returned to vat X together with the beer dealcoholized in the other portion of the apparatus.

To this end, from time to time, some of the low wines are pumped from vat C by pump 57 through discharge 68 into the vat D, where they are raised in temperature, together with the low wines previously contained in the vat, by means of the heating coil 72 and then pumped to the spray nozzles 65 in vat D and discharged downwardly therein to meet the cooler gases and vapors brought over from vat E through conduit 18 and which are continuously passing upwardly through D to return to E by way of conduit 15. In a manner similar to that hitherto described, in their passage through D the gases and vapors absorb both alcohol and other liquids from the downwardly sprayed low wines, and thus return in a more or less saturated condition to pass upwardly through vat E. Simultaneously, however, the low wines, collected in that vat, and which are kept at relatively low temperature therein by means of the cooling coil 74, are pumped up to and discharged from the nozzles 65 in E to meet the rising gases and vapors and condense from them alcohol and other liquids which will collect in the bottom of the vat and are re-circulated in a continuing cycle until the desired alcohol separation is effected, thereby leaving a quantity of "finished beer" in vat D and the low wines in vat E.

By a similar operation in vats F and G a still further separation of the alcohol from the low wines in F, a portion of which is preferably pumped thereinto from vat E is accomplished, so that after a suitable period of operation, the liquids in vats D and F are substantially freed from alcohol, but otherwise have substantially the ordinary characteristics of beer, and those in vats E and G consist very largely of alcohol. The contents of vats D and F are therefore in condition to be transferred to the vat X to mingle with the products from vat A, thus avoiding the necessity of "making up" the dealcoholized beer, the difference in quantity of the final product and the beer with which the process was initiated being substantially equivalent to the amount of alcohol which has been separated out, that is, in the example given to some 3½ barrels.

In the treatment of the beer in vats A, B, and C it is desirable to keep the temperature at all times below a point which would affect the natural characteristics of the beer, and as stated, I have found that the beer may be ordinarily raised to 65° F. and under certain conditions to higher temperatures without detrimental results. However, as but a small portion of the albumenoids and solids are carried over into the other vats, I have found that in treatment of the low wines in vats D to G inclusive, temperatures in excess of 65° F. may be employed if desired. Conversely, owing to the higher alcoholic content of the liquid in these vats, cooling temperatures lower than those employed when the liquid being treated is not so high in alcohol may be utilized without danger of freezing, thereby increasing the difference in temperature between the contacting liquids and gases and increasing the rapidity of the alcohol separation.

To facilitate the foregoing description I assumed that initially there was sufficient condensed low wines in the vats for effective operation, and in practice the apparatus will preferably be operated so that such a condition will ordinarily exist when the performance of the process is begun, but in case for any reason the several vats are entirely empty when it is desired to operate the apparatus, or do not contain a sufficient quantity of low wines, either a suitable amount thereof may be poured into the vats or else the vats may be charged with a suitable amount of water and the apparatus initially operated therewith in place of condensed low wines. It will of coures be apparent the alcohol condensed out of the beer being treated may be drawn off from the vats in which it collects through drains 78 from time to time.

Furthermore, as stated, I assumed in the foregoing description that the process had been in course of performance for a sufficeint period to establish normal working conditions and temperatures, as obviously when the beer is first introduced, say at 35° F., either to tank X and from thence to coil 32, or else directly to the coil, it will not, in its traverse of the coil be raised in temperature until the warm gases and vapors from vat A have heated the coil sufficiently for that purpose, and similarly until normal conditions have been established as regards the circulation of the beer and gases through the tubes 34, the latter will not be sufficiently heated when impinging on coil 32 to have an appreciable effect to elevate the temperature thereof. Once however, that such conditions have been established they may be readily maintained by suitable operation of the valves and other devices by means of which the temperatures of the various coils and the rapidity of flow of the liquids and gases are controlled, the condition of the contents of the apparatus being determinable by observation of the indicating instruments from time to time.

While I have herein described with considerable particularity one method of practising my process of alcohol separation, I do not thereby desire or intend to confine myself specifically thereby, or to the temperatures, pressures and humidities to which I have referred by way of example, as suitable modifications and variations may be made therein and in the manner of performing the process, and the same may be utilized for the separation of alcohol from liquids other than beer, and with apparatus other than that illustrated and described without departing from the spirit and scope of my invention as defined in the appended claims.

Having thus described my invention, I claim and desire to protect by Letters Patent of the United States:

1. The process of dealcoholizing a liquid and recovering the alcohol therefrom which consists in discharging the liquid in such manner as to present an extended surface, bringing a relatively colder gas or vapor into contact with the liquid to absorb alcohol therefrom and then bringing the gas or vapor into contact with a relatively colder finely divided liquid for the purpose of condensing out the absorbed alcohol.

2. The process of dealcoholizing a liquid and recovering the alcohol therefrom which consists in discharging the liquid in such manner as to present an extended surface, bringing a relatively colder gas or vapor into contact with the liquid to absorb alcohol therefrom and then bringing the gas or vapor into contact with a relatively colder finely divided liquid for the purpose of condensing out the absorbed alcohol and repeating the operations until the desired amount of alcohol is separated from the liquid.

3. The process of separating alcohol from a liquid which consists in discharging the liquid in relatively warm condition in such manner as to present an extended surface, bringing a relatively colder gas or vapor into contact with said liquid to absorb alcohol therefrom, condensing said alcohol from said gas or vapor by bringing the gas or vapor into contact with a relatively colder liquid and then separating the alcohol from the condensed liquid by heating said liquid, bringing it into contact with a gas or vapor of relatively lower temperature to absorb the alcohol therefrom and then condensing said alcohol from said gas or vapor by bringing the gas or vapor into contact with a relatively colder liquid.

4. An apparatus for a process of dealcoholization comprising a plurality of vats, means for introducing the liquid to be dealcoholized into one of said vats, means within said vat for causing the liquid therein to present an extended surface for gas contact, means connecting the upper part of said vat with the upper part of one of the other vats, for connecting the lower part of this vat with the lower part of a third vat and for connecting the upper part of the third vat with the lower part of the first vat, and means for causing a circulation of gases from the first mentioned vat through the other vats and thence to said first mentioned vat whereby said gases are caused to impinge on the liquid in the first mentioned vat.

5. In an apparatus for the dealcoholization of liquids, the combination of a plurality of vats, means connecting said vats, means for causing a circulation of gases through said vats and said connecting means, means for introducing the liquid to be dealcoholized into one of said vats, means within said vat for causing said liquid to present an extended surface for gas contact, means for controlling the temperature of the liquid in said vat, means in another of said vats for controlling the temperature of liquid therein, and means in said vat for controlling the temperature of the gases therein.

6. In an apparatus for the dealcoholization of liquids, the combination of a plurality of vats, means connecting said vats, means for causing a circulation of gases throughout said vats and said connecting means, said connections being arranged so that the gases in effecting said circulation will travel in reverse directions in the different vats, means for introducing the liquid to be dealcoholized into one of said vats, means in said vat for causing said liquid to present an extended surface for gas contact in its passage through said vat, means for controlling the temperature of the liquid in said vat, liquid temperature-controlling means in each of the other of said vats, and means whereby the liquid contents of said last mentioned vats may be circulated from the bottom of said vats to the top of said vats and returned to the bottom thereof in finely divided form.

7. In an apparatus for the dealcoholization of liquids, the combination of a plurality of vats, means connecting said vats, means for causing a circulation of gases throughout said vats and said connecting means, said connections being arranged so that the gases in effecting said circulation will travel in reverse directions in the different vats, means for introducing the liquid to be dealcoholized into one of said vats, means in said vat for causing said liquid to present an extended surface for gas contact in its passage through said vat, means for controlling the temperature of the liquid in said vat, liquid temperature-controlling means in each of the other of said vats, means whereby the liquid contents of said last mentioned vats may be circulated from the bottom of said vats to the top of said vats and returned to the bottom thereof in finely divided form, and means in one of said last mentioned vats for directly controlling the temperature of the gases therein.

8. In an apparatus for the dealcoholization of liquids, the combination of a series of vats, means for introducing a liquid to be dealcoholized in the first of said vats, means within said vat for causing said liquid to present an extended surface for gas contact, a conduit connecting the upper part of the first vat with the upper part of the second vat, a conduit connecting the lower part of the second vat with the lower part of the third vat, and a conduit connecting the upper part of the third vat with the lower part of the first vat, means for causing the circulation of gases throughout said vats and said conduits, and means for circulating the liquid contents of the second and third vats within said vats.

9. In an apparatus for the dealcoholization of liquids, the combination of a series of vats, a plurality of conduits connecting the first three vats of the series, means for effecting a circulation of gases through said vats from the upper part of the first vat to the upper part of the second vat, from the lower part of the second vat to the lower part of the third vat and from the upper part of the third vat to the lower part of the first vat, means for introducing the liquid to be dealcoholized into the upper part of the first vat, means within said vat for causing said liquid to present an extended surface for gas contact in its downward passage therethrough, means for causing the circulation of the liquid contents from the bottom of each of the other vats to the upper part thereof, means for causing said liquid to be discharged downwardly within said vats in finely divided form, cooling means for cooling the liquid in the third vat and heating means for raising the temperature of the gases in their passage through said vat, means for transferring the liquid contents of the third vat to the next vat of the series, a conduit connecting the upper part of the said vat with the lower part of the next vat of the series, and a conduit connecting the upper part of the last mentioned vat with the lower part of the other vat, means for causing a circulation of gases through said vats and said conduits, means for causing a circulation of the liquid contents of said vats from the bottom to the upper part thereof, means for discharging the liquid contents of said vats in a finely divided condition downwardly in said vats, and means within said vats for respectively heating and cooling the contents thereof.

In witness whereof, I have hereunto set my hand this 20th day of October, A. D. 1920.

CHARLES H. CASPAR.